United States Patent [19]

Domen

[11] 4,312,224

[45] Jan. 26, 1982

[54] ABSORBED DOSE WATER CALORIMETER

[75] Inventor: Steve R. Domen, Derwood, Md.

[73] Assignee: United States of America, Washington, D.C.

[21] Appl. No.: 126,108

[22] Filed: Feb. 29, 1980

[51] Int. Cl.³ .................. G01K 17/00; G01T 1/16
[52] U.S. Cl. ............................ 73/190 EW; 250/352
[58] Field of Search ......... 73/190 EW, 190 H, 355 R; 324/92, 95; 250/352; 356/216

[56] References Cited

U.S. PATENT DOCUMENTS 2,802,986 8/1957 Chase et al. ..................... 324/95
3,670,570 6/1972 Briones ......................... 73/190EW

OTHER PUBLICATIONS

"A Liquid Calorimeter for High-Energy Lasers", by Damon et al., from Applied Optics, vol. 2, No. 2, Feb. 1963, pp. 163-164.

Primary Examiner—James J. Gill
Attorney, Agent, or Firm—Holman & Stern

[57] ABSTRACT

An absorbed dose water calorimeter that takes advantage of the low thermal diffusivity of water and the water-imperviousness of polyethylene film. An ultrasmall bead thermistor is sandwiched between two thin polyethylene films stretched between insulative supports in a water bath. The polyethylene films insulate the thermistor and its leads, the leads being run out from between the films in insulated sleeving and then to junctions to form a Wheatstone bridge circuit. Convection barriers may be provided to reduce the effects of convection from the point of measurement. Controlled heating of different levels in the water bath is accomplished by electrical heater circuits provided for controlling temperature drift and providing adiabatic operation of the calorimeter. The absorbed dose is determined from the known specific heat of water and the measured temperature change.

17 Claims, 7 Drawing Figures

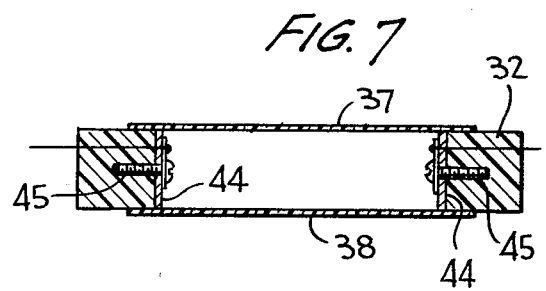
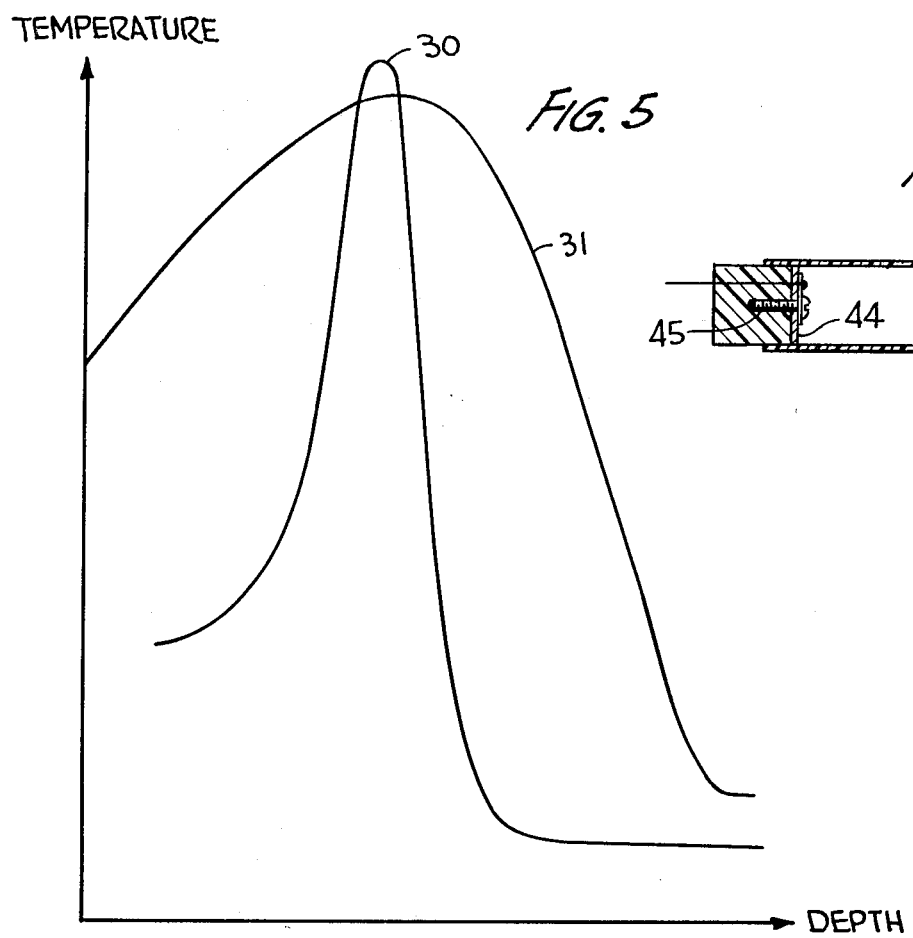

ABSORBED DOSE WATER CALORIMETER

TECHNICAL FIELD

The present invention relates to a device for determining radiation dose and, more particularly, to a standard radiation dose measuring device against which other types of dosimeters may be calibrated.

BACKGROUND ART

The International Commission on Radiation Units and Measurements (ICRU) has established standard conditions for absorbed dose calibrations, under hospital conditions, for which the reference material is water. Calibration of instruments is most direct when compared with a calorimeter that is the primary standard for measuring absorbed dose. For various reasons, it has been considered impractical to calorimetrically measure absorbed dose at a point in water. At various laboratories, measurements are made with ionization chambers or with calorimeters constructed of solid materials, usually graphite or a "tissue-equivalent" plastic. Theoretical calculations are then required to convert the measurements to the water equivalent. However, these calculations require a knowledge of the incident radiation spectrum, which knowledge is often not well known. Estimates of the incident spectrum lead to uncertainities in the calculations, which calculations are very difficult and time-consuming even if the incident spectrum is accurately known. Therefore, it is an object of the present invention to circumvent this problem by providing an operational water calorimeter wherein a measurement can be made at any desired depth, on or off the axis of the radiation beam.

Another difficult problem in measuring absorbed dose concerns the effect of vacuum gaps around the calorimeter bodies which are made of solid material. It is extremely difficult to evaluate this effect experimentally or theoretically for the multitudinous incident radiation and scattering patterns throughout the medium. The problem is further complicated because gaps of varying sizes are provided by different experimenters. It is a further object of the present invention to circumvent this problem by providing a simple water calorimeter which has no such gaps.

DISCLOSURE OF THE INVENTION

In accordance with the present invention, an ultrasmall bead thermistor is sandwiched between two polyethylene films stretched between supports made of polystyrene or the like and submerged in a waterbath. The thermistor and its leads are protected from the water by the polyethylene film sheets which I have found to be remarkably impervious to water. The leads from the thermistor are conducted out from the water bath to a Wheatstone bridge circuit which measures the temperature change sensed by the thermistor as a function of bridge unbalance. The low thermal diffusivity of water results in small temperature changes by conduction at the point of measurement. The absorbed dose from a beam is determined from the known specific heat of water and the temperature rise at the point of measurement (i.e. the point at which the thermistor is located).

Additional layers of polyethylene film, spaced from the sandwiched layers, may be stacked above and below the sandwiched thermistor to provide convection barriers to reduce the effects of convection which, if produced, will cause water circulation about the point of measurement. In a preferred embodiment, the convection barriers incorporate spaced electrodes which permit current to be varied and selectively passed through the water contained within each barrier layer. In addition, two immersed electrodes, covering each opposite side of the tank, permit current to be passed through the water outside the boundaries of the convection barriers. The change of current permits the calorimeter to be brought rapidly under control by counteracting undesirable temperature drifts prior to a beam run. The passage of current also permits the water surrounding the point of measurement to be heated at the same rate as the point of measurement.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings wherein:

FIG. 5 illustrates two typical depth-dose curves for respective types of irradiation beams wherein temperature is plotted against depth in the water bath;

FIG. 6 is a schematic diagram of a circuit used for preventing heat loss at the point of measurement by permitting selective heating of different water layers above and below the point of measurement; and FIG. 7 illustrates the electrode structure employed in the embodiment of FIG. 6.

BEST MODE FOR CARRYING OUT THE INVENTION

Figure 1:
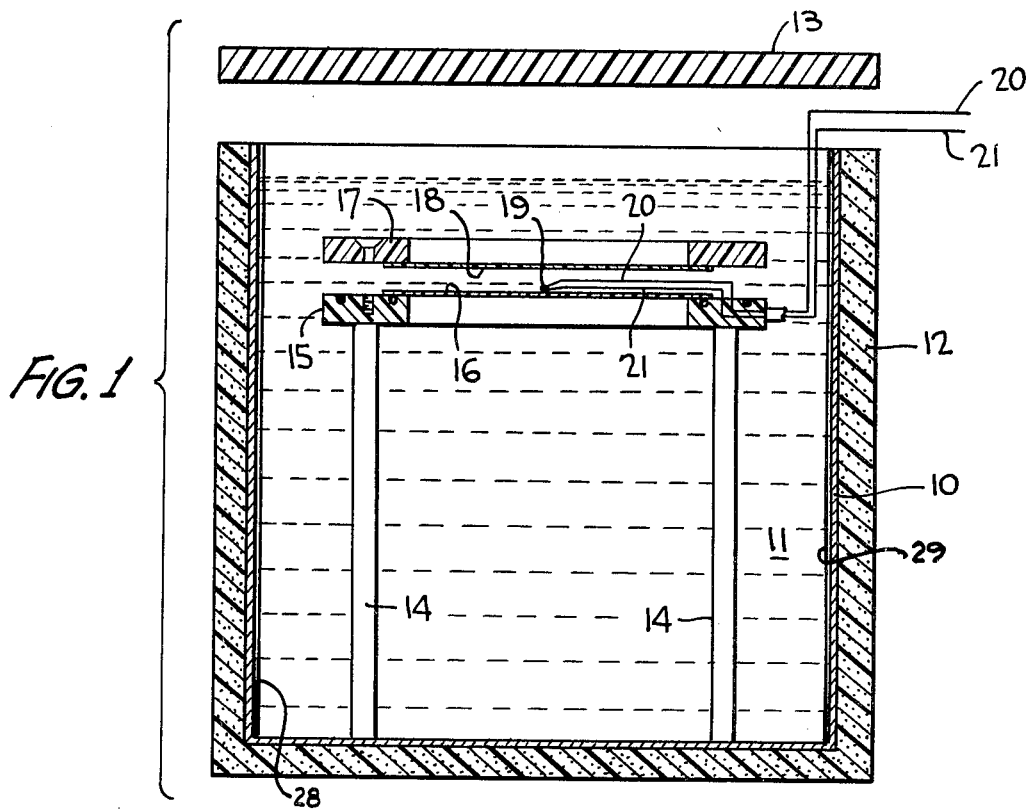
FIG. 1 is a partially schematic view in section of a preferred embodiment of the calorimeter of the present invention, particularly designed to measure absorbed dose produced by an irradition beam directed vertically downward.

Referring specifically to FIG. 1 of the accompanying drawings, a container 10 contains a volume of water 11. The container 10 may have any general configuration, but preferably square in cross-section (ICRU recommendation). The periphery of the container 10 is surrounded by a layer of insulative material 12 such as styrofoam. A styrofoam cover 13 (or thin plastic film) is adapted to be placed over the top of the container. Inside the container, three support posts 14 are secured at the bottom of the container and extend vertically upward. An insulative support ring 15 is affixed atop the support members 14 in a generally horizontal plane. A sheet 16 of very thin polyethylene material is slightly stretched across the upper surface of frame member 15. A second frame member 17, of the same general configuration as frame member 15, is secured atop frame member 15 by a threaded engagement means, or the like. A second sheet 18 of polyethylene film material is secured to the bottom surface of frame member 17 to extend across the entire interior area of the frame member. The two sheets 16 and 18 are slightly stretched across their respective frames so as to eliminate any space therebetween and to avoid any sag in the resulting plane defined by the abutting sheets. An ultra-small bead thermistor 19 is disposed between the two sheets 16 and 18. A pair of thin leads 20 and 21 extend from the thermistor along the plane defined between sheets 16 and 18 and are soldered to heavier wires within frame member 15. The portions of the Formvar coated leads which extend beyond the frame members pass through a watertight sleeve so that the leads can pass through the distilled water 11 and out through the container to a suitable amplifier.

Figure 2:
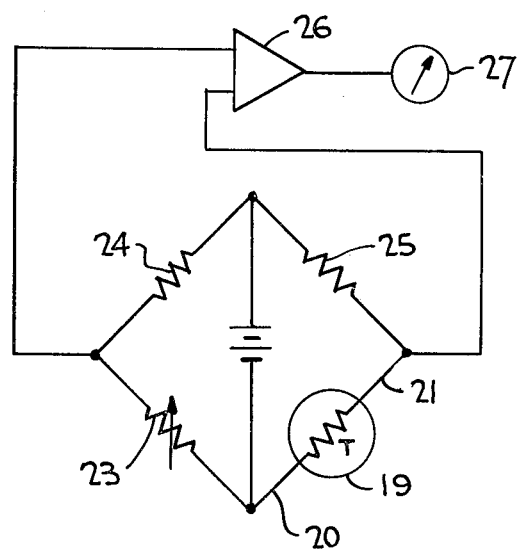
FIG. 2 is a schematic diagram of a measuring circuit used in conjunction with the calorimeter of FIG. 1.

The amplifier to which thermistor 19 is connected is illustrated in FIG. 2. Specifically, the circuit is a Wheatstone bridge circuit comprising a battery 22, resistors 23, 24 and 25 and thermistor 19. The battery 22 is connected between the junction of resistor 23 and thermistor 19 and junction of resistor 24 and resistor 25. The other pair of junctions of the bridge are connected to a differential amplifier 26 which drives a meter or recording device 27. As is well known with the Wheatstone bridge circuit, changes in resistance of thermistor 19 can be measured by varying the resistance of calibrated adjustable resistor 23 until meter 27 is returned to a null position. With a knowledge of the temperature versus resistance characteristic of thermistor 19, one can determine the temperature change of the distilled water at the location of thermistor 19. With a knowledge of the specific heat of water, one can convert the temperature changes at the location of the thermistor to the absorbed doses of radiation at that point.

Figure 3:
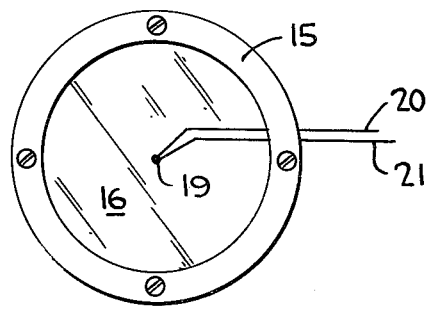
FIG. 3 is a view in plan of one embodiment of the support rings and sandwiched polyethylene film layers wherein an annular frame is employed.
Figure 4:
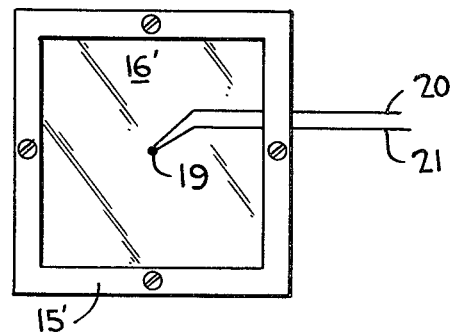
FIG. 4 is a view in plan of an alternative embodiment of the support frame for the sandwiched polyethylene layers wherein a square frame is employed.

Referring to FIG. 3, the frame member 15, in annular form, is illustrated in plan view along with polyethylene sheet 16, thermistor 19 and leads 20 and 21. As indicated above, the frame may be square and such a variant is illustrated in FIG. 4. Specifically, the frame 15' is shown in square form with a square sheet 16' of polyethylene material. Thermistor 19 and leads 20 and 21 are also illustrated in FIG. 4.

An important aspect of the invention illustrated in FIGS. 1-4 relates to my discovery that the polyethylene sheets 16 and 18 are sufficiently impervious to water to provide excellent electrical insulation for the thermistor 19 and the portion of the leads 20 and 21 residing within the sandwich defined by sheets 16 and 18. In addition, sheets 16 and 18 should be of a material having a specific heat as close as possible to that of the specific heat of water which is 1.0. The reason for this is that whenever a beam of radiation is directed down into the calorimeter, any material other than water in the calorimeter experiences a temperature rise higher than that experienced by the water. The excess heat buildup in this material begins to flow out into the water, heating up the water and thereby distorting the water temperature measurement by the thermistor 19. If the sheets or films 16 or 18 are made extremely thin, the amount of excess heat supplied is extremely small and therefore the heating effect they will have on the water is very much reduced. I have calculated that sheet thicknesses between 15 and 30 micrometers serve satisfactorily in this regard because their presence requires a correction within a few tenths of a percent.

Another characteristic of the films or sheets 16 or 18 is that they should have as close a specific heat to that of water which is 1.0. In other words, if a material could be found which could satisfy the insulation requirements, absorb approximately the same energy as an equal thickness of water, and also has the same heat capacity as the water it displaces, it would substantially retain heat generated within the material to the same extent as the water and would not have any heating effect on the surrounding water. In this regard, I have found that polyethylene material with a specific heat of 0.55 cal/(g° C.) appears to provide the best compromise between the insulation and the specific heat criteria. The irradiation beam deposits approximately the same energy in the films as a film of water of equal thickness.

Summarizing the requirements for the film material, it must: (1) be as thin as possible; (2) have a specific heat as close as possible to that of water; and (3) have an extremely low water absorption (highly impervious to water).

It is also important that the thermistor 19 be as small as possible in order that it generates as little excess heat as possible from the radiation. As noted above, any material in the water which generates excess heat that it cannot retain heats up the surrounding water near the point of measurement and thereby distorts the water temperature sensed by the thermistor. Therefore, the present invention contemplates use of ultra-small bead thermistors. I have calculated that thermistors having a 0.25 millimeter diameter produce an entirely negligible effect, well within a tenth of a percent. However, thermistors with smaller diameters can also be used. In any case, the smaller the thermistor, the more accurate is the measurement due to the fact that the thermistor generates less excess heat from the radiation beam.

The portion of the thermistor leads which resides outside the sandwich made by films 16 and 18 are enclosed in a teflon sleeve which I have found to retain its insulative qualities. Silicone rubber is applied around the joint where the sleeve emerges from frame 15. The frames 15 and 17 are preferably made of polystyrene which have beam scattering effects similar to water. The preferred means of securing the two frame members 15 and 17 together is nylon screws.

It should be noted that, for increased sensitivity, it may be desirable to utilize two thermistors disposed near each other between the sandwiched plastic sheets 16 and 18. Under such circumstances, the second thermistor would take the place of resistor 24 in the bridge circuit of FIG. 2.

For certain applications, it should also be noted that air temperature regulation may be required around the structure shown in FIG. 1. This, of course, depends on the temperature variation in the ambient environment in which the calorimeter is located. Immersion heaters and cooling coils are located in the water bath and means are provided to agitate the water to rapidly bring the water to a uniform and operating temperature. Means for accomplishing this are well known and need not be described in detail herein. The heater, cooler, and agitator are, of course, not in operation during a beam measurement.

It should further be noted that it is desirable to provide a mechanism for selectively raising or lowering the level of the water to permit measurements to be made at different depths in the water bath. This will be accomplished by pouring water into a container located outside the water bath but connected to it by a flexible tube. Micrometer measurements to the water surface in the container provide an accurate determination of how much the depth of measurement has changed.

A plurality of thermistors may be supported at different depths in the bath between different pairs of frame members, each thermistor having its own bridge circuit, or, being selectively switchable into a common bridge circuit.

In addition, and referring to FIG. 1, two immersed electrodes 28 and 29 may be provided on opposite sides of the container to permit current to be passed through water. The change of current permits the calorimeter to be brought rapidly under control by counteracting undesirable temperature drifts prior to a beam run.

As mentioned above, it is desirable to prevent possible convection in the region of the water bath surrounding the point of measurement so that the actual heat absorption at the point of measurement can be accurately sensed. The need for preventing convection is best illustrated by reference to FIG. 5, wherein temperature in a water bath is plotted against depth in the bath for two typical radiation beams, it being understood that the shape of the resulting curve depends upon, among other things, the nature and strength of the radiation beam. In general, as seen from curves 30 and 31, the temperature peaks at a certain depth, the depth of the peak being different for different beam strenghts and types. For example, the lower the beam energy, the steeper the slope of the curve beyond the peak. In any event, it will be appreciated from curves 30 and 31 that a difference in temperature at different depths in the water bath will tend to establish a convection force in the bath. However, the onset of convection is determined by various physical parameters and the geometry of the apparatus, and it is well known that the onset of convection does not occur until the Rayleigh number exceeds approximately 1000. One way of preventing convection flow from distorting the temperature effect at the point of measurement is to reduce the Rayleigh number by providing a series of frame members 15 and 17 of the type illustrated in FIG. 1, wherein a stretched film of plastic material is provided between each pair of frames. The films tend to preclude a convection flow in the regions surrounding the thermistor since water between each layer of films remains substantially stagnant. A stack such as this is described in more detail in relation to FIG. 6 below; however, before describing the apparatus of FIG. 6, notice should be taken of another problem with which the apparatus of FIG. 6 is intended to cure. This problem is described in the following paragraph.

It is important that the calorimeter be made to operate adiabatically; otherwise, there may be irradiation conditions wherein heat loss by conduction may be appreciable even though the thermal diffusivity of water is small. Although corrections will be made for appreciable heat losses by the usual techniques, it is of value to compare this method of determining absorbed dose with the adiabatic method of operation. THe heat loss depends upon the shape of the appropriate temperature-depth curve (FIG. 5), with sharper changes in temperature gradient resulting in more rapid temperature changes at the point of measurement. To correct this problem, it is desirable to supply supplementary electrical heating in localized areas of the bath, such as areas where the steep drop off of the temperature-depth curve occurs, as well as at depths beyond the electron range. With this in mind, reference is now made to FIGS. 6 and 7 of the accompanying drawings.

FIG. 6 shows a stack of individual frame members 32, 33 and 34 disposed above frame member 17. For purposes of simplification and ease of understanding, the surrounding water bath and container 10 have been omitted in FIG. 6, it being understood that the entire assembly of frame members are disposed in that water bath. Additional frame members 35 and 36 are attached below frame member 15. The number of frame members stacked above and below frame members 15 and 17 can be changed to suit the particular needs in a given embodiment. A thin film 37 of plastic material froms the upper boundary to frame member 32. Film 37 is substantially the same materials as films 16 and 18. A further film 38, also of the same type is stretched across the bottom of frame member 32 so that it is disposed between the immediately abutting frame members 32 and 33. Similar film members 39, 40, 41, 42 and 43 are disposed across the different frame members so that the interior space between the stacked frame members is subdivided by the films 37–43 into respective regions wherein water from the bath is located. More particularly, the water from the bath enters the regions between the films by leaking through the frame members which, although in abutting relationship and secured by means of screws or the like are not water tightly sealed. It may be seen that the films 37–43 serve as convection barriers, limiting the flow of heat away from or toward, as the case may be, the thermistor 19 which remains sandwiched between the two films 16 and 18 somewhere in the middle of the stack.

In addition, a portion of the interior wall on opposite sides of each frame member has an electrically conductive material such as thin metal strips 44. This is more clearly illustrated in FIG. 7 wherein frame 32 is shown enlarged and wherein thin metal strips 44 are shown secured to the inside wall of the frame on opposite sides, such as by means of silicone rubber. Screws 45 secure the heavy Formvar coated wires to the strips. If the frames are square, of the type shown in FIG. 4, the strips 44 are merely placed along the entire length of opposite interior sides of the frame. If the frame has some other configuration, such as the annular frame illustrated in FIG. 3, the strips extend along a predetermined arcuate segment of the interior frame wall on opposite sides of the frame. Each pair of opposed electrodes 44 and the water therebetween constitutes a circuit element connected by a respective switch 51–57 to the arm of a potentiometer 48. The potentiometer is connected in parallel across the series combination of a voltage source 47 and main switch 49. Upon actuation of switch 49, current is caused to flow between electrode pairs for which the corresponding switch 51–57 is closed. The magnitude of current is determined by the position of the arm of potentiometer 48. It should also be noted that each individual switch 51–57 has its own control potentiometer so that individual current control for each pair of electrodes 44 may be obtained.

When the appropriate switches in the FIG. 6 circuit are closed, current passes through the water at the switch-selected levels so that the water at the selected level is heated. The films 37–43 serve to confine the heating to the space through which the current is conducted; that is, the heating is confined fairly well between the films because the films, although thin, have relatively high electrical resistance so that the current seeks the path of least resistance through the distilled water between the foil electrodes 44. If a temperature drift is noted in the thermistor reading, any of switches 51–57 or controls can be appropriately operated to change the heating of the surrounding region as necessary to thereby bring the surrounding region to a temperature equilibrium. To illustrate the operation of the circuit of FIG. 6, consider, for example, that a measurement is to be made at a depth corresponding to the peak of curve 30 in FIG. 5. It is desired to force the plateaus or confined levels above and below this depth to rise in temperature as closely as possible to the rate of temperature rise at the point of measurement. It may not be necessary that all of the switches 51–57 be closed, depending upon the spacing between the films 37–43. At the instant the radiation beam is turned on, switch 49 is closed and is then opened when the beam is turned off. The effect of the electrical heating of the different water levels is to cause the water levels surrounding the point of measurement to maintain a temperature as close as possible to the temperature at the point of measurement thereby preventing heat loss. The actuation of the various switches and setting of the current levels through the various plateau levels are determined from prior beam and electrical measurements and knowledge of the depth dose curve. To aid in the accuracy of the measurements, a selector switch and a multimeter will permit measurements of potential and resistance across each water sector.

As mentioned above, the frame members 15, 17 and 32–36 are preferably made of polystyrene, either annular or square in configuration. The space between interior walls of the frame is preferably about six inches. Polystyrene closely resembles water in that its density is 1.04 grams per cubic centimeter and therefore scattering from the frames will cause negligible effect on the sensor located at the geometric center. However, the specific heat of polystyrene is only approximately one-third that of water which means that the temperature of the polystyrene rises three times higher than the temperature of the water for an equal dose rate applied with a broad beam. This may lead one to conclude that the high rise in temperature of the polystyrene may cause significant effects on the sensor. However, I have calculated that for water temperature increases of 1° centigrade, accompanied by a 3° centigrade rise in the polystyrene temperature, the resulting effect of the polystyrene on the sensor is such that one must wait much longer than 20 minutes in the case of the annular ring and 28 minutes in the case of the square to experience a temperature increase at the sensor of 0.1%. This is entirely acceptable.

It is realized that, in the circuit of FIG. 6, if only one section is heated the resulting change in drift may be too fast. However, if three sections are heated, one section on each side of the original section, the temperature gradients surrounding the first section are diminished. The systems acts as though the calorimeter body increased in heat capacity (or that the calorimeter had a decrease in thermal emissivity). As more and more pairs of sections are switched into the circuit, the effect becomes more pronounced. However, the more sections in operation around the thermistor, the slower will be the reaction time to decreasing the drift as a result of changing the value of resistor 48. However, this reaction delay can be considerably shortened by choosing a section in which the current heating can be stopped by opening appropriate switches 51–57. However, a slow reaction time has an advantage because small intial drifts will be more predictable during the course of a run.

The measurement described thus far is that of absorbed dose essentially at a single point in water. Sensors could be placed in a pattern between the film sandwich and any number of these arrays can be placed at desired depths in a water bath. A fast readout system, in a single irradiation run, can then simultaneously measure the response of each sensor as a function of time at various locations to give a dose profile.

It should also be noted that the thermistor, appropriately insulated, may be mounted between parallel wires (also insulated) but can also be used as signal leads. Tests showed that heavy formvar coatings provided on wires are also remarkably impervious to water. Particularly if the sensor is made to be a thermal couple junction (with no electrical power dissipated), at the end of the run, the sensor can be moved along with the mounting wires a few millimeters. This permits the thermistor to be moved away from the water having the excess temperature derived from its non-water materials and higher energy dissipation during irradiation. The sensor can then very rapidly dissipate its excess temperature and equilibrate with the undisturbed temperature of the water where a measurement of dose is to be made.

I have described herein a calorimeter for measuring absorbed radiation dose directly in an essentially continuous water medium. A thermistor is sandwiched between two thin polyethylene films which provide the necessary high and stable electrical resistance for the thermister and its leads. Advantage is taken of the low thermal diffusivity of water that results in small temperature changes by conduction at a point of measurement. Absorbed dose is determined from the known specific heat of water and the temperature rise at the point of measurement. The temperature rise at the point of measurement is determined from a calorimeter measurement and the experimentally determined absolute temperature sensitivity of a sensing thermistor.

It will be understood that changes and modifications may be made to the invention described above by those skilled in the art without departing from the spirit and scope of the invention as set forth in the claims appended hereto.

What I claim is:

1. A calorimeter-radiation dosimeter for measuring an absorbed dose profile comprising:
    a container for a liquid;
    sensing means for sensing temperature at a predetermined location in said container;
    insulative means supporting said sensing means at said predetermined location; and
    means responsive to said sensing means for providing an indication representing the temperature at said predetermined location;
    wherein said insulative means comprises a pair of thin plastic sheets which are impervious to said liquid, said pair of sheets being tightly sandwiched together with said sensing means between them.

2. The apparatus according to claim 1 further comprising means for slightly changing the temperature of the liquid in said container by changing an electrical current through the liquid in said container.

3. The dosimeter according to claim 1 wherein said plastic sheets are polyethylene sheets having a thickness no greater than 30 micrometers each.

4. The dosimeter according to claim 3 wherein said sheets are slightly stretched across and supported between two insulative frame members.

5. The dosimeter according to claim 4 further comprising heating means for heating selected regions of water near said predetermined location, said heating means comprising:
    a plurality of additional frame members stacked above and below said two frame members;

a plurality of spaced individual sheets of plastic film stretched across respective frame members to define said selected regions between adjacent individual sheets; and means for selectively passing electrical current through water in said selected regions.

6. The dosimeter according to claim 5 wherein said last-named means comprises:

voltage supply means;

a pair of terminal means disposed on each of said frames at opposite ends of a respective selected region;

switch means for selectively connecting said voltage supply means across said each pair of terminal means; and means for selectively adjusting the voltage of said voltage supply means.

7. The dosimeter according to claim 6 wherein said terminal means are thin metal strips.

8. The dosimeter according to claims 1 or 2 further comprising heating means for heating selected regions of water proximate said predetermined location.

9. The dosimeter according to claim 1 wherein said last-mentioned means comprises a Wheatstone bridge circuit having four circuit arms and wherein said thermistor is connected in one of said circuit arms.

10. The dosimeter according to claim 1 further comprising thermal insulation means surrounding said container of water.

11. A method of measuring absorbed radiation dose comprising the steps of:

(a) directing a radiation beam into a liquid bath;

(b) interposing a temperature sensing means in the path of said beam at a predetermined location in said bath by supporting the sensing means between two thin sheets of plastic material sandwiched together at said predetermined location to insulate the sensing means from the surrounding liquid; and (c) measuring the temperature rise brought about by the beam at said predetermined location by monitoring changes in the output of said sensing means.

12. The method according to claim 11 further comprising the step of determining the absorbed radiation dose at said predetermined location from the measured temperature rise and the known specific heat of water.

13. The method according to claim 11 further comprising the steps of changing the level in said bath with a minimum of disturbance by pouring liquid into a container located outside the bath and connected to the bath by a flexible tube and utilizing a micrometer measurement of the change in depth in the bath.

14. The method according to claim 11 further comprising the step of selectively heating different locations in said water bath to minimize temperature drift at said predetermined location.

15. The method according to claim 11 wherein said step of heating comprising passing an electric current through said different locations.

16. The method according to claim 11 further comprising the steps of:

rapidly raising or lowering the temperature of the water with immersion heaters or coolers; and agitating the water to produce a uniform water temperature.

17. The method according to claim 11 further comprising the step of slightly changing the temperature of the liquid to decrease temperature drifts by changing an electrical current through the bath.

* * * * *